United States Patent
Imai et al.

(10) Patent No.: US 6,673,460 B2
(45) Date of Patent: *Jan. 6, 2004

(54) COMPOSITE STRUCTURE AND PRODUCTION METHOD THEREOF

(75) Inventors: Yasushi Imai, Kanagawa-ken (JP); Tadashi Utsunomiya, Kanagawa-ken (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 147 days.

(21) Appl. No.: 09/497,200

(22) Filed: Feb. 3, 2000

(65) Prior Publication Data

US 2002/0150776 A1 Oct. 17, 2002

(30) Foreign Application Priority Data

Feb. 4, 1999 (JP) .......................... 11-027664

(51) Int. Cl.$^7$ .............................. B32B 15/06
(52) U.S. Cl. ................. 428/462; 428/457; 428/461; 156/242; 156/245; 361/685
(58) Field of Search ................ 428/461, 457, 428/462; 361/685; 427/409; 156/242, 275.7, 245; 264/478

(56) References Cited

U.S. PATENT DOCUMENTS

| | | | | |
|---|---|---|---|---|
| 4,374,956 A | * | 2/1983 | Coran et al. ............... | 525/296 |
| 4,601,941 A | * | 7/1986 | Lutz et al. .................. | 428/213 |
| 5,102,956 A | * | 4/1992 | Holmes-Farley ........... | 525/285 |
| 5,741,857 A | * | 4/1998 | Esneault et al. ............ | 525/97 |
| 5,763,824 A | * | 6/1998 | King et al. ................. | 361/816 |
| 5,793,566 A | * | 8/1998 | Scura et al. ............. | 360/97.02 |
| 5,828,546 A | * | 10/1998 | Tirrell et al. ............... | 361/685 |
| 6,303,180 B1 | * | 10/2001 | Bunyan et al. .............. | 427/58 |
| 6,329,459 B1 | * | 12/2001 | Kang et al. ................ | 524/505 |

\* cited by examiner

Primary Examiner—Monique R. Jackson
(74) Attorney, Agent, or Firm—Oblon, Spivak, McClelland, Maier & Neustadt, P.C.

(57) ABSTRACT

A composite structure comprising a metallic sheet and two thermoplastic material layers of a layer (A) and a layer (B) which are placed in turn and integrated with each other, characterized in that the layer (A) comprises a thermoplastic material capable of being thermally fusedly adhered to the thermoplastic material in the layer (B), the metallic sheet and the layer (A) are adhered to each other, and the layers (A) and (B) are thermally fusedly adhered to each other; and a process for producing a composite structure which comprises installing, on a metallic sheet by coating, a layer (A) comprising a thermoplastic material capable of being thermally fusedly adhered to a thermoplastic material in a layer (B) to be placed thereon, and further installing the layer (B) on the layer (A) by thermally fusedly adhering a desirable thermoplastic material on the (A).

12 Claims, 1 Drawing Sheet

COMPOSITE STRUCTURE AND PRODUCTION METHOD THEREOF

BACKGROUND OF THE INVENTION

1. Field of the Invention

The present invention relates to a composite structure which comprises a metallic sheet and thermoplastic materials and a process for the production of said composite structure. In particular, the present invention is concerned with a composite structure which is well suited for use in a gasketed cover and the like used for housing electronic equipment. In the present invention, an injection molded thermoplastic material is integrated with a metallic sheet which is coated in advance with an adhesive, and a process for readily and efficiently producing said composite structure.

2. Description of the Related Arts

The development of electronic equipment in recent years is a cause for amazement. The previously mentioned equipment, which is subjected to printed circuit on a substrate by the use of integrated circuits utilizing semiconductors, is directed to compact, lightweight equipment which is prone to be readily damaged by moisture or dampness in particular. Accordingly, the hermetically sealing properties of a case housing electronic equipment is a factor of importance for the performance and durability of the electronic equipment.

The case housing electronic equipment constitutes a box body and a cover body, which are integrated by interposing on the joining surface thereof, a gasket made of vulcanized rubber, a urethane foam and a thermoplastic material. The gasket is fitted to a cover body and thus fixed to the cover, but there is unavailable a favorable method of adhesively bonding the gasket to the cover body. Accordingly, the adhesion is carried out by a (1) method comprising fixing the gasket on the cover body by means of a double-coated tape, or a (2) method comprising making holes in the cover body and fixing a gasket material from both sides of the cover body through the holes. The gasketed cover body is fixed on a box body by means of screws and accordingly, the fixing job is markedly facilitated by the adhesion of the gasket to the cover body.

As the above-mentioned first method, there is usually adopted a method in which a sheet like gasket material to which a double-coated tape is adhered is punched into the shape of a gasket, and the resulting gasket is fixed to the cover body. However, such a method is involved in such problems problematic in that most of the sheet-like gasket material after punching remains as waste material. Further, the production process is intricate or troublesome, thus inevitably increasing the production cost, since the gasket is fixed to the cover body after the gasket material has been punched into the requisite shape.

In the second method mentioned above, since the gasket material is exposed on the upper side of the cover body, it is sometimes upturned or curled when the cover body is inserted into the space of an electronic equipment main body. This space has been narrowing in recent years with the compaction of electronic equipment part items. Thus, such upturning or curling is responsible for defective sealing properties.

In addition, when the gasket which is fitted to a cover body is produced by such a method, and is used in a hard disc unit, it is impossible to suppress vibration due to the rotation of the hard disc.

The adhesion between a thermoplastic material and a metallic sheet such as the cover body is usually carried out by a method in which the thermoplastic material is subjected to adhesion treatment on the surface thereof by corona discharge or the like, and thereafter is stuck to the metallic sheet by using an epoxy-based or a urethane-based adhesive. However, such a method is intricate and troublesome and may involve gas generation. Thus, this method is inapplicable for a gasket used in electronic equipment.

In order to simply and facilitate the aforesaid job, consideration is given to a method comprising injection molding an adhesive thermoplastic material for the purpose of direct adhesion. However, such a thermoplastic material, even when being made rather hard, is enlarged upon injection molding, thereby making it impossible to employ the molded product as a gasket. Therefore, said method has not been adopted for production of a gasket for a cover body in a hard disc.

SUMMARY OF THE INVENTION

It is an object of the present invention to provide a composite structure which comprises a metallic sheet and a thermoplastic material which are adhered by injection molding. The resulting composite structure has excellent vibration-damping properties and is well suited for use as a gasket fitted to a cover body to be used for housing electronic equipment and the like.

Other objects of the present invention will become evident from the text of the specification hereinafter disclosed.

In view of the foregoing, intensive research and extensive investigation was conducted by the present inventors in order to develop the above-mentioned composite structure having favorable properties. As a result, it has been found that the general object can be achieved by a composite structure which is equipped, on a metallic sheet by coating, with a layer comprising a thermoplastic material capable of being thermally, fused adhered to a thermoplastic material to be placed thereon, and further equipped on said layer with a layer comprising a desirable thermoplastic material by means of thermal fusion adhesion. The present invention has been accomplished on the basis of the above-mentioned findings and information.

Specifically, the present invention provides a composite structure comprising a metallic sheet and two thermoplastic material layers which are integrated with each other. The first of the two thermoplastic layers comprises material capable of being thermally fusedly adhered with the second thermoplastic layer. The metallic sheet and the first thermoplastic layer are adhered to each other by coating, and the two thermoplastic layers are thermally fused adhered to each other. The present invention further provides a process of producing a composite structure which comprises installing, on a metallic sheet by coating, a layer (A) comprising a thermoplastic material capable of being thermally fused adhered to a thermoplastic material in a layer (B) to be placed thereon, and further installing the layer (B) on said layer (A) by thermally fusedly adhering a desirable thermoplastic material on said layer (A).

DESCRIPTION OF THE PREFERRED EMBODIMENTS

Figure 1:
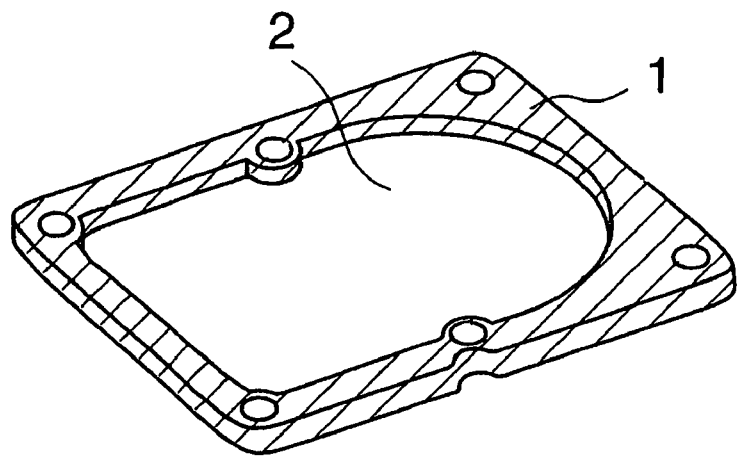
FIG. 1 is a perspective illustration which shows one example of a gasket fitted to a cover body according to the present invention, wherein the symbols 1 and 2 denote gasket and cover body, respectively.

The composite structure according to the present invention comprises a metallic sheet and two thermoplastic material layers of a layer (A) and a layer (B) which are placed in turn and integrated with each other.

The above-mentioned metallic sheet can be selected from any appropriate material such as cold rolled steel sheets, galvanized steel sheets, aluminum/zinc alloy plated steel sheets, stainless steel sheets, aluminum sheets, aluminum alloy sheets, magnesium sheets and magnesium alloy sheets.

Preferably, there is used a metallic sheet which is treated with non-electrolytic nickel plating. This type of sheet is inexpensive and excellent in corrosion resistance. As a method for non-electrolytic nickel plating, any of the well known methods that have heretofore been applied to metallic raw materials may be used. For instance, a method which comprises immersing a metallic sheet to be treated in a non-electrolytic nickel plating bath comprising an aqueous solution at a pH of approximately 4.0 to 5.0 and at a temperature of approximately 85 to 95° C. which contains nickel sulfate, sodium hypochlolite, lactic acid, propionic acid and the like each in a proper proportion may be used.

The thickness of the metallic sheet to be employed in the the present invention is properly selected for use according to the purpose of use of the composite structure, and is in the range of usually from 0.1 to 2 mm, preferably from 0.2 to 1 mm.

Layer (A) is a layer comprising a layer capable of being thermally fusedly adhered to the thermoplastic material in layer (B) to be placed thereon. The thermoplastic material in layer (A) is properly selected for use according to the type of the thermoplastic material to be used in layer (B). For instance, layer (A) may be materials such as polyolefinic resin, polystyrenic resin, and acrylic resin. If a styrenic thermoplastic elastomer is used in layer (B), it is advantageous to use a modified polyolefinic resin as a thermoplastic material in layer (A). In this case, the polyolefinic resin is exemplified by a homopolymer of an α-olefin such as ethylene; propylene; butene-1; 3-methylpentene-1; and 4-methylpentene-1, a copolymer of at least two of these, and a copolymer of any of these and another polymerizable unsaturated monomer. Typical examples thereof include ethylenic polymer such as high density, intermediate density and low density polyethylenes, straight-chain low density polyethylene, ethylene/vinyl acetate copolymer and ethylene/ethyl acrylate copolymer, propylenic polymer such as a propylenic homopolymer, propylene/ethylene block or random copolymer, propylene/ethylene/diene compound copolymer, polybutene-1; and poly 4-methylpentene-1.

In order to enhance the adhesion to the metal, the above-mentioned resins are incorporated with an acid anhydride, a functional group such as carboxyl group, carboxylic acid ester group or chlorosulfonate group, or a halogen.

Layer (A) in the present invention is adhered to the metallic sheet by means of coating. In this case, the coating is carried out usually at a temperature close to the softening point or melting point of the thermoplastic material to be used. The thickness of layer (A) is selected in the range of usually from 3 to 100 μm, preferably from 5 to 30 μm.

In the composite structure according to the present invention, a thermoplastic material layer such as layer (B) is formed on layer (A) by means of thermal fusion adhesion. The thermoplastic material which constitutes layer (B) is not specifically limited, but can be selected for from various materials according to the purpose of use of the composite structure.

When, for instance, the composite structure is used as a sealing member, and the gasket portion is layer (B), the thermoplastic material which constitutes layer (B) is preferably a thermoplastic material having a low hardness of less than 60 degrees in terms of JIS hardness A. Examples of thermoplastic materials having a low hardness include thermoplastic elastomers of styrenic base, olefinic base, urethane based and acrylic base, respectively. In particular, with regard to a case for housing electronic equipment, it is preferable to use a material that interrupts moisture and air and also does not generate a halogen base gas or an acidic gas. For adhesion to the box body of a case and tackiness, it is preferable to use a material having a JIS hardness of less than 60 degrees, especially in the range of 15 to 45 degrees. The above-mentioned thermoplastic material is preferably a thermoplastic elastomer of styrenic base, which is exemplified by styrene/butadiene/styrene block copolymer (SBS), hydrogenated styrene/butadiene/styrene block copolymer (SEBS), styrene/isoprene block copolymer (SIR), styrene/isoprene/styrene block copolymer (SIS) and hydrogenated styrene/isoprene/styrene block copolymer (SEPS).

Specific examples of the foregoing styrenic thermoplastic elastomer include "Rubberon" manufactured by Mitsubishi Chemical Industries Co., Ltd., specifically exemplified by "Rubberon MJ4300B" (trade name) having a JIS hardness A of 45 degrees and "Rubberon T320C" (trade name) having a JIS hardness A of 15 degrees, "Septon" manufactured by Kuraray Co., Ltd., specifically exemplified by "Septon 2063" (trade name) having a JIS hardness A of 36 degrees, and "Elastomer AR" manufactured by Aron Kasei Co., Ltd. Different from EPDM and butyl rubber, the styrenic thermoplastic elastomer need not vulcanization and can be recycled, thereby greatly contributing to cost curtailment. Specific examples of the olefinic thermoplastic elastomer include "Santprene" manufactured by A. E. S. Japan Inc. (trade name) having a JIS hardness A of 45 degrees.

The thermoplastic material which constitutes layer (B) may be used alone or in combination with at least one other thermoplastic material.

With respect to the composite structure according to the present invention, the thickness of the layer (B) to be placed on the aforesaid layer (A) by means of thermal fusion adhesion is not specifically limited, but can be properly selected for use in accordance with the purpose of use of the composite structure, and it is in the range of usually 0.1 to 5 mm, preferably 0.2 to 2 mm.

It is possible in the present invention that the thermoplastic material layer for layer (B) be incorporated, as desired and to the extent that the objects of the present invention are not impaired, with such additives as an antioxidants (age resistors), ultraviolet absorbers, light stabilizers and a variety of fillers specifically exemplified by carbon black, talc, barium sulfite, calcium carbonate, magnesium carbonate, metal oxide, mica, graphite, aluminum hydroxide, various metallic powders, wood chipping, glass powder, ceramic powder, granular or powdery polymer, glass fiber, metallic fiber, and organic fiber.

Particularly preferred as the composite structure in the present invention is one comprising a styrenic thermoplastic elastomer as layer (B) and a polyolefinic thermoplastic elastomer as layer (A).

The process for producing the composite structure according to the present invention is not specifically limited, provided that said process is capable of producing the composite structure imparted with the above mentioned properties. According to the simplified process of the present invention as described hereunder, it is made possible to efficiently produce a desirable composite structure.

In the process according to the present invention, first of all, layer (A) is formed on a metallic sheet which has been preferably subjected to non-electrolytic nickel plating by coating the metallic sheet with a thermoplastic material (hereinafter sometimes referred to as "thermoplastic material I") capable of being thermally fusedly adhered to the thermoplastic material in layer (B) (hereinafter sometimes referred to as "thermoplastic material II) to be placed on layer (A). The metallic sheet or the metallic sheet which has been subjected to non-electrolytic nickel plating may be subjected as needed, to a surface treatment such as plasto-treatment, treatment by hair line, etching, crack plating, oxidation, anodic oxidation, corona discharge plasma or primer coating.

Layer (A) may be formed by use of an aqueous emulsion of the thermoplastic material I if the environment or suppression of gas generation is a concern. Specifically, in the case, layer (A) may be formed by pulverizing a thermoplastic material I such as polyolefinic resin and emulsifying the resultant pulverized material with an emulsifier according to well known methods to prepare an aqueous emulsion containing thermoplastic material I, and applying a coating of the resultant emulsion. In this case, an adhesive component with good adhesivity, such as urethane base or epoxy base, may be added thereto as required, to the extent that the objects of the present invention are not impaired thereby.

Subsequently, by applying a solution of the modified adhesive polyolefinic resin onto the metallic sheet so that the resultant coating is of a desired thickness by a well known method such as brush coating, padding coating, spray coating, roller coating and flow coating, followed by drying, layer (A) is formed adhesively onto the metallic sheet.

It is preferable to apply the solution of the modified adhesive polyolefinic resin only to the portion where the gasket material is adhered by means of a dispenser, pat printing, screen printing or the like from the viewpoint of preventing gas generation and curtailing the manufacturing cost.

Subsequently, by thermally fusedly adhering a desired thermoplastic material II, for instance, styrenic thermoplastic elastomer or the like onto layer (A) layer (B) is formed. In the formation of layer (B), there is preferably used an injection insertion method. For instance, a metallic sheet equipped with layer (A) is arranged in a mold, and thermoplastic material II is injected onto layer (A) so that the thermoplastic material II and the thermoplastic material I are thermally fused adhered one to another to form layer (B) having a desired thickness on layer (A). Alternatively, it is possible to use a method in which layer (B) is formed onto layer (A) by thermally fusedly adhering the layers by means of a pressing method.

The thermal fusion adhesion temperature is properly selected according to the types of the thermoplastic material I and the thermoplastic material II. For instance, where polypropylene is used as the thermoplastic material I and SEBS or SEPS, that is, styrenic thermoplastic elastomer is used as the thermoplastic material II, the temperature is in the range of approximately 170 to 200 ° C.

In a manner as described, it is possible to obtain the composite structure according to the present invention wherein the metallic sheet and the thermoplastic materials are integrated with one another.

According to the process of the present invention, it is possible to readily integrate the thermoplastic material for a gasket and the metallic sheet by injection molding by applying, in advance, a solution of an adhesive resin without deteriorating the physical properties of the thermoplastic material. Further, the composite structure according to the present invention has excellent vibration-damping properties, since the metallic sheet is laminated with the thermoplastic material I. Thus, it is well suited for use in a gasket fitted to a cover body to be used in sealing members, particularly electronic equipment.

Moreover according to the present invention, it is possible to prevent adhesive of dirt and dust and the leakage of electromagnetic waves by mixing an electroconductive material with the thermoplastic material I, and/or the thermoplastic material II. In a similar fashion, it is also possible to prevent heat accumulation in a hard disc by mixing a material having high heat releasability with thermoplastic material I so as to enable release of internally generated heat to the outside.

As described, the composite structure according to the present invention, wherein the metallic sheet and thermoplastic materials are integrated with one another in good adhesion by applying in advance an adhesive resin onto the metallic sheet, and then injection molding the thermoplastic gasket material, has excellent vibration-damping properties, and is well suited for use as a gasket fitted to a cover body to be used in electronic equipment and the like.

Furthermore, the production process according to the present invention enables efficient production of the composite structure, dispensing with intricate or troublesome steps.

Hereinafter, the present invention will be described in further detail with reference to comparative examples and working examples. It is understood by one skilled in the art that certain modifications may be made without departing from the spirit or scope of the invention.

EXAMPLE 1

An aluminum sheet having a thickness of 0.5 mm equipped with non-electrolytic nickel-plated film of 5 $\mu$m in thickness was coated with a solution of a modified adhesive polyolefinic resin (maleic acid-modified copolymer of propylene, ethylene and butene, manufactured by Mitsubishi Chemical Industries Ltd. under the trade name "Unistol P-802"), and the resultant coated sheet was heat treated at 50° C. to prepare an aluminum sheet having a coated film of 30 $\mu$m in thickness.

Subsequently, onto the resultant adhesive polyolefinic resin coat formed on the aluminum sheet, there was insertion molded a styrenic thermoplastic elastomer having a JIS hardness A of 45 degrees (manufactured by Mitsubishi Chemical Industries Ltd. under the trade name "Rubberon MJ 4300B") in a thickness of 0.5 mm by the use of an injection molding machine under the temperature conditions of the nozzle and cylinder at 180° C. and the insert aluminum sheet at room temperature to prepare a composite structure.

The composite structure thus obtained was subjected to a peel test for styrenic thermoplastic elastomer in accordance with JIS Z 0237. As a result, there was found destruction of the material of the thermoplastic elastomer along with delamination on the interface between the aluminum sheet and the adhesive polyolefinic resin coat. However, the peeling strength at the time of delamination was at least 1.6 kg/25 mm, thus showing sufficient adhesion strength for fixing the composite structure to the main body by means of screws.

COMPARATIVE EXAMPLE 1

The procedure in Example 1 was repeated except that the adhesive polyolefinic resin coat was not formed on the aluminum sheet subjected to non-electrolytic nickel plating. The styrenic thermoplastic elastomer was directly insertion molded onto the aluminum sheet. As a result, there was a failure in adhesion, and the elastomer was separated from the aluminum sheet when it was taken out.

EXAMPLE 2

FIG. 1 is a perspective view illustrating a gasket fitted to a cover to be used for a case housing a hard disc drive unit as one embodiment of the composite structure according to the present invention. The gasket is viewed from the sealing surface side. A gasket 1 is adhered to the surface of a metallic cover body 2 as a cover for the case housing a hard disc drive unit. Equipment and machinery such as a magnetic disc, a magnetic head and an actuator are arranged in the box body side of the case housing a hard disc drive unit, closed with said box body (not illustrated on the drawing) and said gasket fitted to the cover, and are housed in said case.

The cover body 2 is made of an aluminum sheet which had a thickness of 0.5 mm and which was equipped with non-electrolytic nickel-plated film of 5 μm in thickness. The cover body 2 was coated with a solution of a modified adhesive polyolefinic resin (maleic acid-modified adhesive polypropylene, manufactured by Mitsubishi Chemical Industries Ltd. under the trade name "Unistol R-300"), and the resultant coated sheet was heated in the same manner as in Example 1 to prepare an aluminum sheet with the coated film of 30 μm in thickness.

Subsequently, onto the resultant polypropylene coat formed on the aluminum sheet, there was insertion molded a styrenic thermoplastic elastomer in a thickness of 0.5 mm in the same manner as in Example 1 to form the gasket 1 and prepare a gasket fitted to a cover. As the result of peel test in accordance with JIS Z 0237, the peeling strength at the time of delamination was at least 1.4 kg/25 mm, thus showing sufficient adhesion strength for fixing said gasket to the main body by means of screws.

The gasket fitted to a cover thus prepared was used as the cover of the case housing a hard disc drive unit for a period of 30 days so that the gasket portion faced the box body. Thereafter, visual observation was made of the gasket portion. As a result, the dust prevention properties during the service were satisfactory and there was no observable sagging on the gasket portion. Further observation was made of the vibration-damping performance of the gasket fitted to a cover in the hard disc drive unit. As a result, resonance due to the hard disc was not observed.

COMPARATIVE EXAMPLE 2

The procedure in Example 2 was repeated except that the modified adhesive polyolefinic resin coat was not formed on the aluminum sheet. Thus, there was prepared a gasket fitted to a cover by injection molding a styrenic thermoplastic elastomer onto a cover body having holes for fixing said elastomer. Then, observation was made of the vibration-damping performance of the gasket fitted to a cover in the hard disc drive unit. As a result, resonance due to the hard disc was observed.

As is apparent from the foregoing results, the gasket fitted to a cover as one of the embodiments of the present invention, can readily be produced, exhibits favorable dust prevention properties owing to good adhesion between the gasket and the cover body when used as a cover of a case housing a hard disc drive unit, and is free from any deformation even after an extended time of service, because the gasket is constituted of a material having a low hardness.

What is claimed is:

1. A hard disc drive comprising an adhesive layer (A) an a thermoplastic gasket (B) fitted to a metallic cover for the hard disc drive, wherein the adhesive layer (A) comprises a modified polyolefinic resin, the gasket (B) consists essentially of hydrogenated styrene/butadiene/styrene block copolymer and/or hydrogenated styrene/isoprene/styrene block copolymer, and the gasket (B) is thermally fused onto the adhesive layer (A).

2. The hard disc drive of claim 1, wherein the metallic cover comprises aluminum.

3. The hard disc drive of claim 2, wherein the metallic cover comprises aluminum with non-electrolytic nickel plating.

4. The hard disc of claim 1, wherein the block copolymer has a hardness of less than 60°.

5. The hard disc drive of claim 1, wherein the block copolymer has a hardness of from 15 to 45°.

6. The hard disc drive of claim 1, wherein the gasket (B) is thermally fused by injection molding.

7. A method for producing a hard disc drive, said method comprising:

coating a metallic cover for the hard disc drive with an adhesive layer (A) and thermally fusing a thermoplastic gasket (B) onto the adhesive layer (A), wherein the adhesive layer (A) comprises a modified polyolefinic resin, and the gasket (B) consists essentially of hydrogenated styrene/butadiene/styrene block copolymer and/or hydrogenated styrene/isoprene/styrene block copolymer.

8. The method of claim 7, wherein the metallic cover comprises aluminum.

9. The method of claim 7, wherein the metallic cover comprises aluminum with non-electrolytic nickel plating.

10. The method of claim 7, wherein the block copolymer has a hardness of less than 60°.

11. The method of claim 7, wherein the block copolymer has a hardness of from 15 to 45°.

12. The method of claim 7, wherein the gasket (B) is thermally fused by injection molding.

* * * * *